(12) United States Patent
Kajino et al.

(10) Patent No.: US 6,657,710 B2
(45) Date of Patent: Dec. 2, 2003

(54) LENS METER

(75) Inventors: Tadashi Kajino, Okazaki (JP); Osamu Mita, Gamagori (JP)

(73) Assignee: Nidek Co., Ltd., Gamagori (JP)

( * ) Notice: Subject to any disclaimer, the term of this patent is extended or adjusted under 35 U.S.C. 154(b) by 0 days.

(21) Appl. No.: 10/211,579

(22) Filed: Aug. 5, 2002

(65) Prior Publication Data

US 2003/0030789 A1 Feb. 13, 2003

(30) Foreign Application Priority Data

Aug. 9, 2001 (JP) ........................................ 2001-243036

(51) Int. Cl.[7] ................................................ G01B 9/00
(52) U.S. Cl. ........................................ 356/124; 356/127
(58) Field of Search .................................. 356/124–127

(56) References Cited

U.S. PATENT DOCUMENTS

| | | | | |
|---|---|---|---|---|
| 3,880,525 A | | 4/1975 | Johnson | ...................... 356/124 |
| 5,523,836 A | * | 6/1996 | Minix | ......................... 356/124 |
| 5,734,465 A | | 3/1998 | Kajino | ......................... 356/124 |
| 5,844,671 A | * | 12/1998 | Kajino et al. | ................. 356/124 |
| 5,971,537 A | * | 10/1999 | Fukuma et al. | ................ 351/44 |
| 6,061,123 A | * | 5/2000 | Ikezawa et al. | .............. 356/124 |
| 6,236,453 B1 | * | 5/2001 | Ikezawa et al. | .............. 356/124 |
| 6,359,684 B2 | * | 3/2002 | Ikezawa et al. | .............. 356/124 |
| 6,496,253 B1 | * | 12/2002 | Vokhmin | ..................... 356/124 |

FOREIGN PATENT DOCUMENTS

JP    A 2001-124662    5/2001

\* cited by examiner

*Primary Examiner*—Michael P. Stafira
(74) *Attorney, Agent, or Firm*—Oliff & Berridge, PLC

(57) ABSTRACT

A lens meter capable of easily measuring optical characteristics of far and near viewing sections of a multifocal lens to obtain optical characteristics of a multifocal lens. The lens meter comprises a first measurement optical system having a first measurement optical axis, for measuring optical characteristics of a far viewing section of a multifocal lens, and a second measurement optical system having a second measurement optical axis which is different from the first measurement optical axis, for measuring optical characteristics of a near viewing section of the multifocal lens.

13 Claims, 8 Drawing Sheets

LENS METER

BACKGROUND OF THE INVENTION

1. Field of the Invention

The present invention relates to a lens meter for measuring optical characteristics of a lens for an eye such as a spectacle lens.

2. Description of Related Art

Conventionally, there is known a lens meter which projects a measurement light bundle onto a lens and detects the measurement light bundle transmitted through the lens with a photodetector, then obtains optical characteristics of the lens based on the detected results. Normally, the lens meter of this kind measures optical characteristics of the lens placed on a nosepiece. And, in the case of measuring optical characteristics of a multifocal lens such as a progressive focal lens (referred to as a progressive lens hereinafter), the lens meter detects a far viewing section of the lens and measures optical characteristics thereof, then detects a near viewing section and measures optical characteristics thereof.

Thus, the conventional lens meter needs an operation of seeking optimum measuring points of the far viewing section and the near viewing section while moving the lens on the nosepiece, and the operation is troublesome particularly in the case of the progressive lens. In particular, this is difficult for an unskilled operator, and there are problems in accuracy in measurement and reproducibility.

SUMMARY OF THE INVENTION

The present invention has been made in view of the above circumstances and has an object to overcome the above problems and to provide a lens meter which can measure optical characteristics of a multifocal lens, particularly a progressive lens easily.

To achieve the objects and in accordance with the purpose of the present invention, as embodied and broadly described herein, a lens meter for measuring optical characteristics of a lens is provided with a first measurement optical system for measuring optical characteristics of a far viewing section of a multifocal lens and a second measurement optical system for measuring optical characteristics of a near viewing section of the multifocal lens. The first measurement optical system has a first measurement optical axis, and the second measurement optical system has a second measurement optical axis which is different from the first measurement optical axis.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings.

DETAILED DESCRIPTION OF THE PREFERRED EMBODIMENTS

Figure 1:
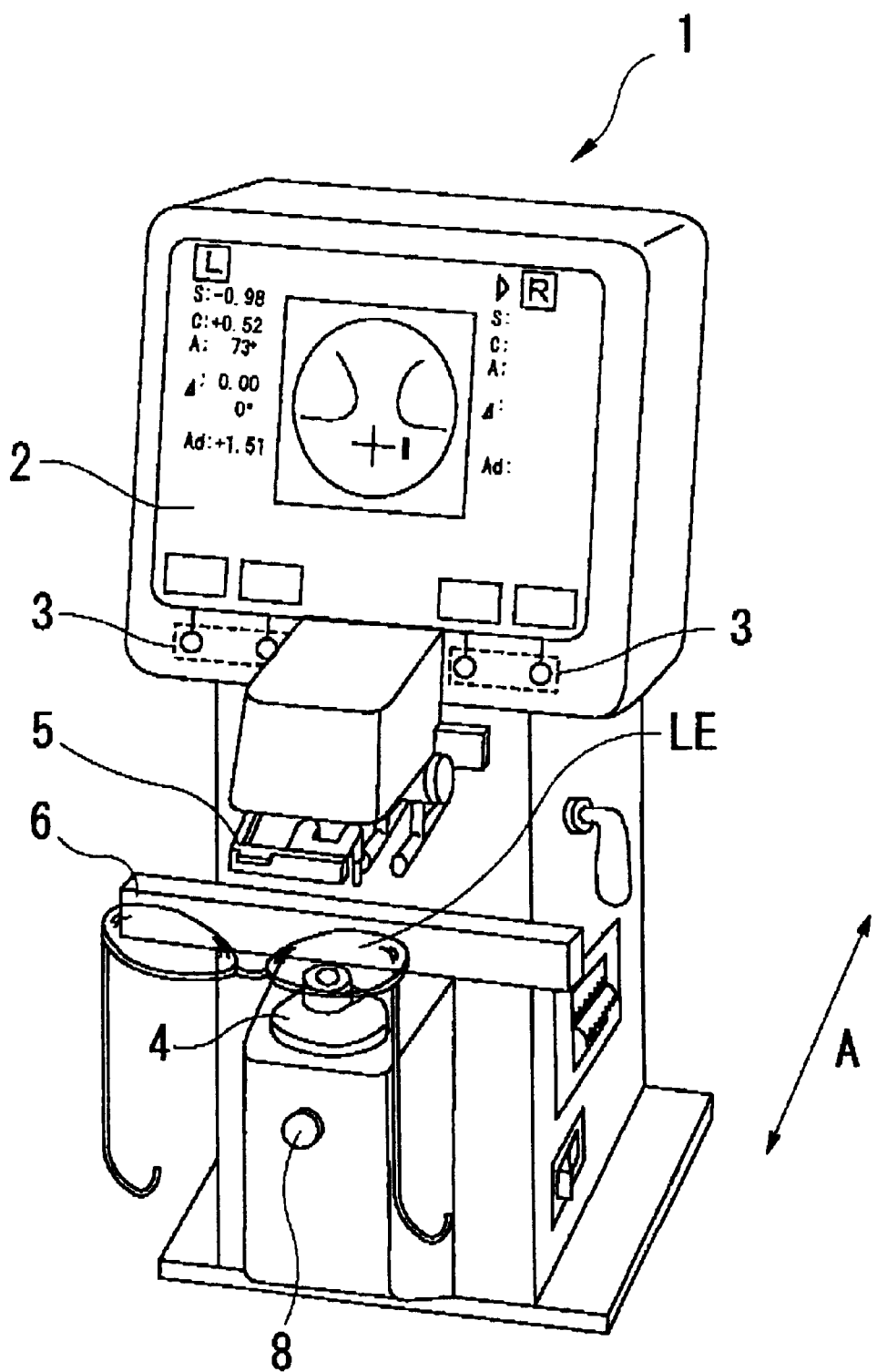
FIG. 1 is a schematic external view of a lens meter of the present preferred embodiment.

A detailed description of one preferred embodiment of a lens meter embodying the present invention will now be given referring to the accompanying drawings. FIG. 1 is a schematic external view of a lens meter of the preferred embodiment.

Reference numeral 1 indicates a main body of a lens meter. A display 2 is composed of an LCD and the like, and displays information necessary for a measurement, including a target for alignment, and measurement results. Switches 3s are used for input. One of them, corresponding to a switch display on the display 2, is pushed to perform necessary instructions for input such as a changeover of a measurement mode. A nosepiece (lens rest) 4 is for putting a lens LE to be measured thereon and serves as a reference point at the time of the measurement. A lens holder 5 is lowered (toward nosepiece 4 side) for stably holding the lens LE which is placed on the nosepiece 4. Incidentally, in the present embodiment, the description is given with a progressive lens used as the lens LE, however, other types of multifocal lenses and a single focal lens can surely be measured.

A lens table (a frame table) 6 is movable in the back-and-forth direction (the direction of an arrow A in FIG. 1). At the measurement of the lens LE in frames, the lens table 6 is brought into contact with the bottom ends (the bottom ends under a condition of wearing spectacles) of the right and left lenses (or the right and left lens frames), and stabilizes the lens LE so that the astigmatic axial angle can be measured accurately. A switch 8 is used for storing data about the optical characteristics of the lens LE. The switch 8 is pushed, and a measurement result is thereby displayed on the display 2 and stored into a memory 41 (described later) inside the body 1.

Figure 2:
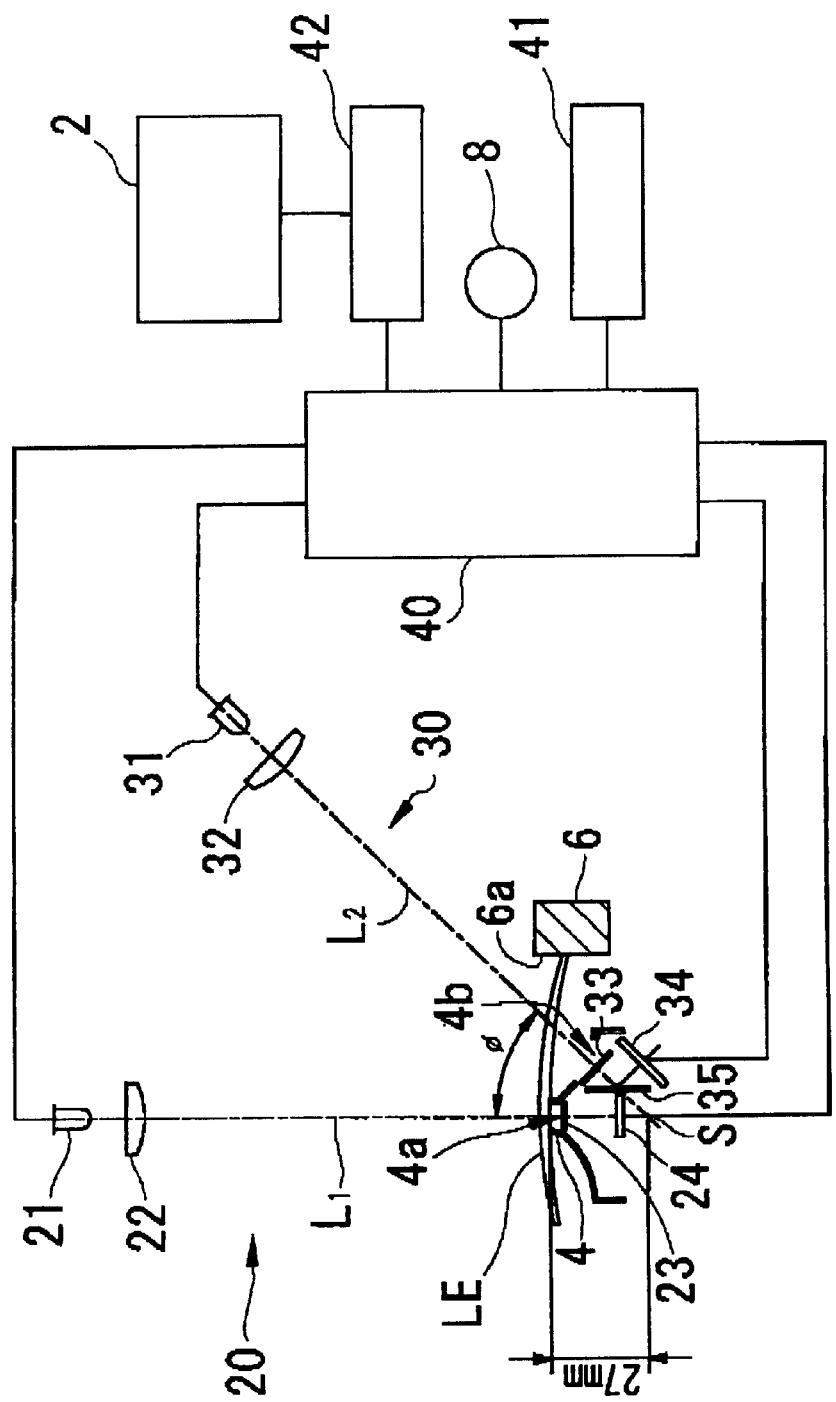
FIG. 2 is a view of a schematic configuration of an optical system and a control system of the present lens meter.

FIG. 2 is a view of a schematic configuration of an optical system and a control system of the present lens meter. The optical system is shown from the right side when the main body 1 of the lens meter is viewed from the front. A first measurement optical system 20 is used for the measurement of a single focal lens, that of a far viewing section of the progressive lens and the like, and L1 is a measurement optical axis thereof. The first measurement optical system 20 is provided with a measurement light source 21 such as an LED, a collimating lens 22, a grid target plate 23 with a measurement target formed thereon and a two-dimensional image sensor 24, which are disposed on the optical axis L1. The optical axis L1 passes through the approximate center of an aperture 4a of the nosepiece 4 and is disposed approximately perpendicular to an opening plane of the aperture 4a.

Figure 3:
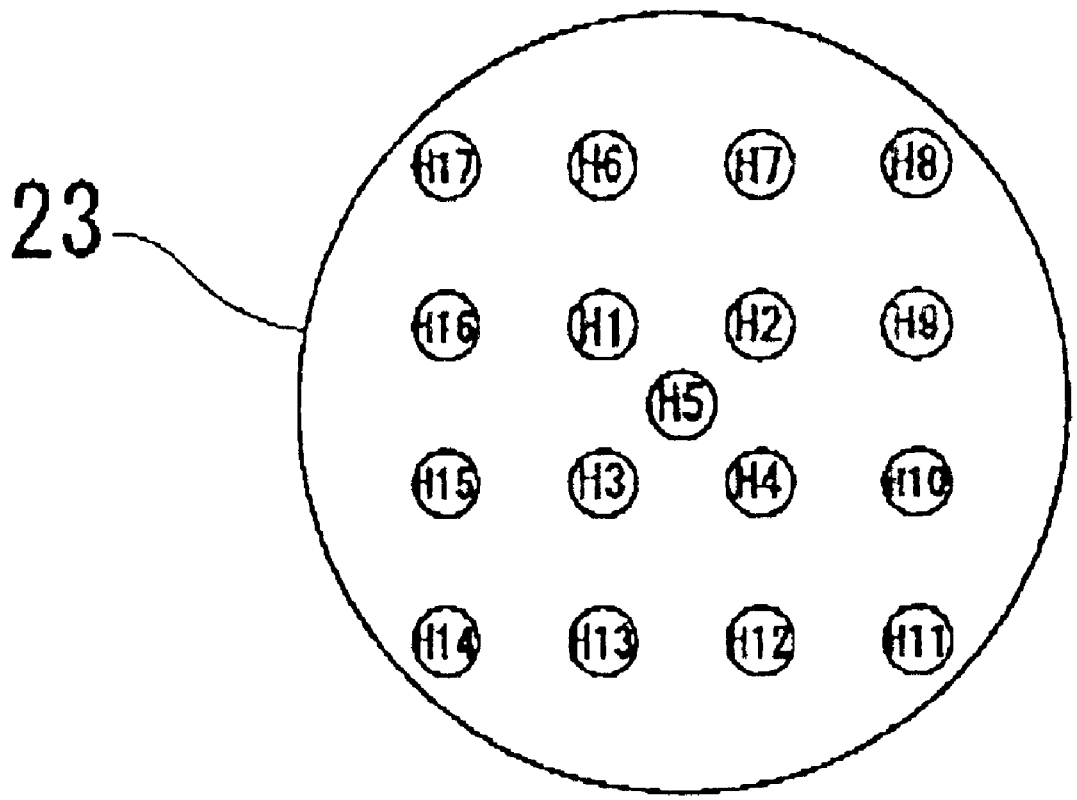
FIG. 3 is a view showing a pattern of a grid target plate disposed on a first measuring optical axis.

FIG. 3 shows a pattern of the measurement target of the target plate 23. The external diameter of the target plate 23 is φ 8 mm which is approximately equal to the internal diameter of the aperture 4a, and seventeen holes H1 to H17 of φ 0.2 mm in diameter are formed therein. The holes other than the central hole H5 are spaced uniformly with a pitch of 1.8 mm. The central hole H5 is in the middle of the target plate 23 so as to be disposed on the optical axis L1 and used for checking the position of each hole and measuring a prism. A size of the measurement region formed by the group of the holes H1 to H4 is made to be a size which enables a contact lens to be measured as well (at the time of the measurement of the contact lens, the aperture 4a is narrowed (or a smaller one is used)). A measurement light bundle from the light source 21 is changed into a parallel light bundle by the collimating lens 22 and projected onto the lens LE. Of the light bundle transmitted through the lens LE, the light bundle having passed through the aperture 4a and each hole in the target plate 23 enters the image sensor 24.

A second measurement optical system 30 is used for the measurement of a near viewing section of a progressive lens and the like, and L2 is a measurement optical axis thereof. The second measurement optical system 30 is provided with a measurement light source 31 such as an LED, a collimating lens 32, a grid target plate 33 with a measurement target formed thereon, and a mirror 35, all of which are disposed on the optical axis L2, and a two-dimensional image sensor 34. The image sensor 34 is placed at a position for receiving the light reflected by the mirror 35. The measurement light bundle from the light source 31 is changed into a parallel light bundle by the collimating lens 32 and projected onto a large region including a periphery of the near viewing section of the lens LE. Of the light bundle transmitted through the lens LE, the light bundle having passed through an aperture 4b of the nosepiece 4 and each hole in the target plate 33 is reflected from the mirror 35 and enters the image sensor 34. The aperture 4b has a size which enables the light bundle transmitted through the lens LE to illuminate the whole target plate 33, and is formed on the nosepiece 4. In addition, the optical axis L2 passes through the approximate center of the aperture 4b.

Figure 4:
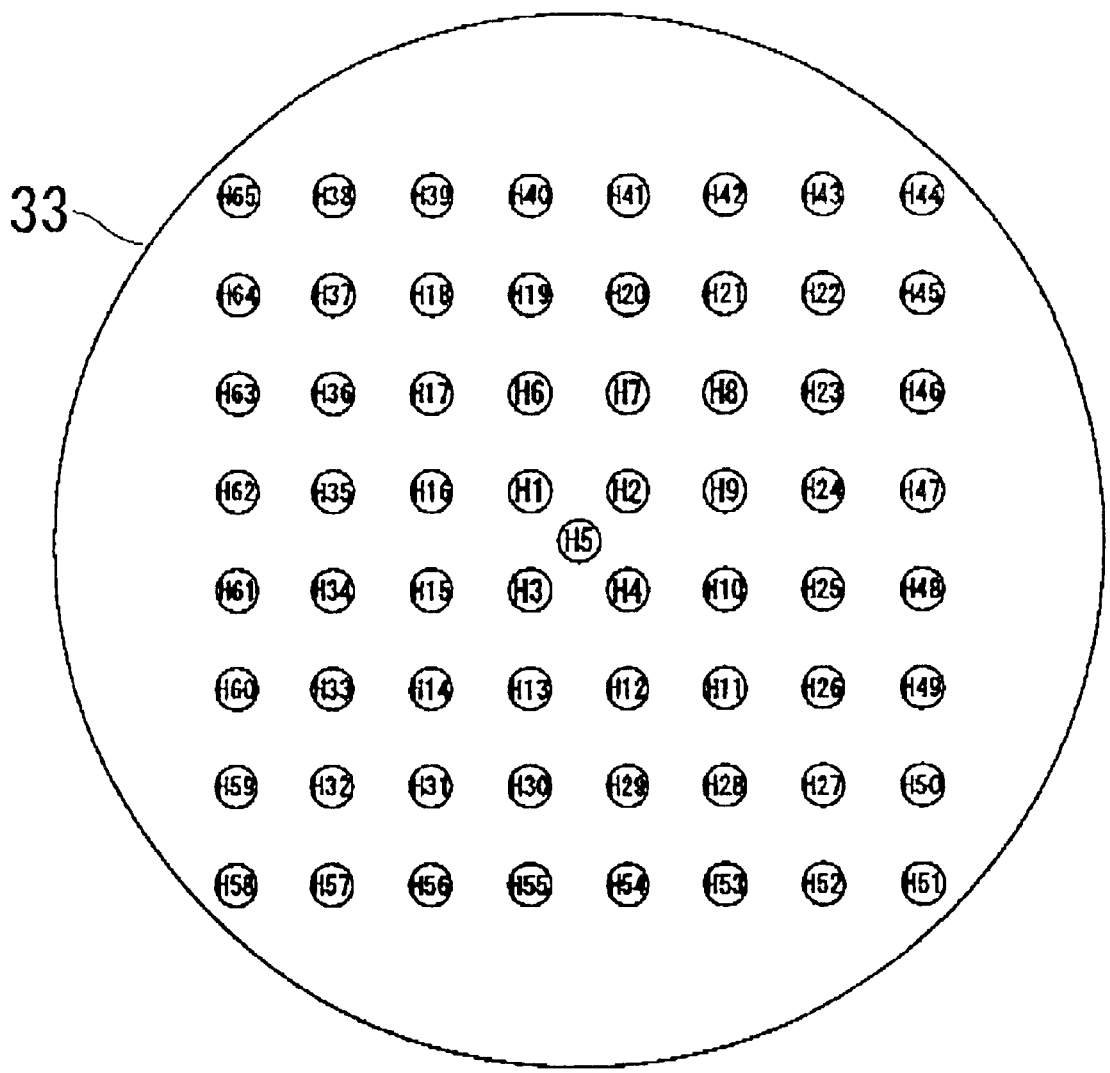
FIG. 4 is a view showing a pattern of a grid target plate disposed on a second measuring optical axis.

FIG. 4 shows a pattern of the measurement target of the target plate 33. On the target plate 33, uniformly-spaced holes H18 to B37 which form a larger circumference than the measurement target pattern (H1 to H17) of the target plate 23, and uniformly-spaced holes H38 to H65 which form a next larger circumference are formed. This is for measuring the near viewing section of the lens LE over a wide range and enabling to perform a positioning of a measuring point of the near viewing section. Incidentally, as is the case with the target plate 23, the central hole H5 is in the middle of the target plate 33 so as to be disposed on the optical axis L2. The size of the region of the measurement target pattern of the grid plate 33 is preferred to set a measurement region of the lens LE at 10 to 40 mm inclusive in diameter. In other words, the lower limit of the range is 10 mm in diameter on the assumption that the eccentricity of the measuring point of the near viewing section in the right-and-left direction is 4 mm at the maximum. The upper limit of the range is 40 mm so as not to interfere with the far viewing section in the up-and-down direction.

The optical axis L2 is disposed on a plane which is approximately vertical to a contact surface 6a of the lens table 6 and which includes the optical axis L1 so as to intersect with the optical axis L1 at an angle φ. The intersecting point S (of the optical axes L1 and L2) is positioned at a distance between 25 and 30 mm from the top end of the aperture 4a (i.e. a position of the approximate back surface of the lens LE when put on the nosepiece 4 (the aperture 4a)). This is decided in consideration of a distance between the center of rotation of an eye and the back surface of the spectacles lens under a condition of wearing spectacles. The distance is 27 mm in this embodiment.

In addition, the angle φ is set in order that, when the far viewing section of the lens LE is placed on the nosepiece 4 (aperture 4a), i.e. when the optical axis L1 passes through the far viewing section, the periphery of the near viewing section of the lens LE is on the aperture 4b, i.e. the optical axis L2 passes through the vicinity of the near viewing section of the lens LE. The angle φ may be an average angle calculated from the positions of the measuring point of the far viewing section and that of the near viewing section of several progressive lenses. In the present lens meter, the distance between the center of the far viewing section and that of the near viewing section is set at 4.5 mm.

Signals output from the image sensors 24 and 34 are input into a control unit 40. With reference to the position of the image of each hole which reaches the image sensors 24 and 34 in the case of the lens LE not being placed on the nosepiece 4, the control unit 40 calculates the optical characteristics (a spherical power, a cylindrical power, an astigmatic axial angle, and an amount of prism) of the lens LE from the positional deviation of the image of each hole in the case of the lens LE having a refractive power placed on the nosepiece 4. For example, when the optical center of a lens having only a spherical power is placed at the center of four holes (e.g. H1 to H4), the images of the four holes scale up or down uniformly in an annular shape from the center of each position in the case of the lens not being placed. And, the spherical power can be determined based on the amount of scale-up or down. In addition, when the axis of a lens having only a cylindrical power is placed at the center of the four holes (e.g. H1 to H4), the images of the four holes scale up or down in an oval shape from the center of each position in the case of the lens not being placed. Then, the cylindrical power can be determined based on the amount of scale-up or down. Further, the astigmatic axial angle can be determined by the axial direction of the oval shape. Furthermore, the amount of prism can be determined by the amount of translation of the center of the images of the four holes. The lens having the spherical power, the cylindrical power, the amount of prism and the like may be considered to be a combination of these cases (see Japanese Patent Application Unexamined Publication SHO50-145249).

Incidentally, if the holes of the target plate 23 (33) at the approximate center of the aperture 4a are four in number (at least three), optical characteristics necessitated are generally obtained. The target plate 23 of the present lens meter, however, has similar holes H6 to H17 on the periphery of the four holes H1 to H4 in the center, and the optical characteristics are obtained for each group of any four (at least three) adjoining holes of the holes H1 to H17 except the central hole H5. Considering the four (at least three) adjoining holes as one group, different measuring positions are formed within the aperture 4a, and optical characteristics at each measuring position are obtained. That is to say, in this embodiment, optical characteristics are obtained at a total of nine measurement positions corresponding to nine groups of the holes such as a group of the holes H1 to H4. Owing to such arrangement of the holes (target) through which the light bundle goes, at the measurement of a progressive lens, optical characteristics of the lens at plural measuring positions inside the aperture 4a can be obtained, and whether the present measuring position is in the far viewing section or not is efficiently judged. Similarly, at the measurement of the near viewing section with the target plate 33, whether the present measuring position is in the near viewing section or not is efficiently judged by obtaining optical characteristics of each group of any four (at least three) adjoining holes of the holes H1 to H65 except the central hole H5.

Incidentally, the target plates 23 and 33 may be disposed on the sides of the light sources 21 and 31 respectively relative to the lens LE placed on the nosepiece 4 (the aperture 4a). In addition, a plurality of the light source 21 and that of the light source 31 may be disposed two-dimensionally for obtaining a light bundle similar to the light bundle having transmitted through the target plates 23 and 33. The control unit 40 is connected with a memory 41 for storing the measurement results and a displaying circuit 42 for displaying information about the measurement such as the measurement results on the display 2.

The operation of the lens meter of the present invention having an above-described structure will be described below. Here will be described the measurement of the progressive lens in frames. Incidentally, an up-and-down direction, a right-and-left direction and a horizontal direction are the directions under a condition of wearing spectacles.

Figure 5:
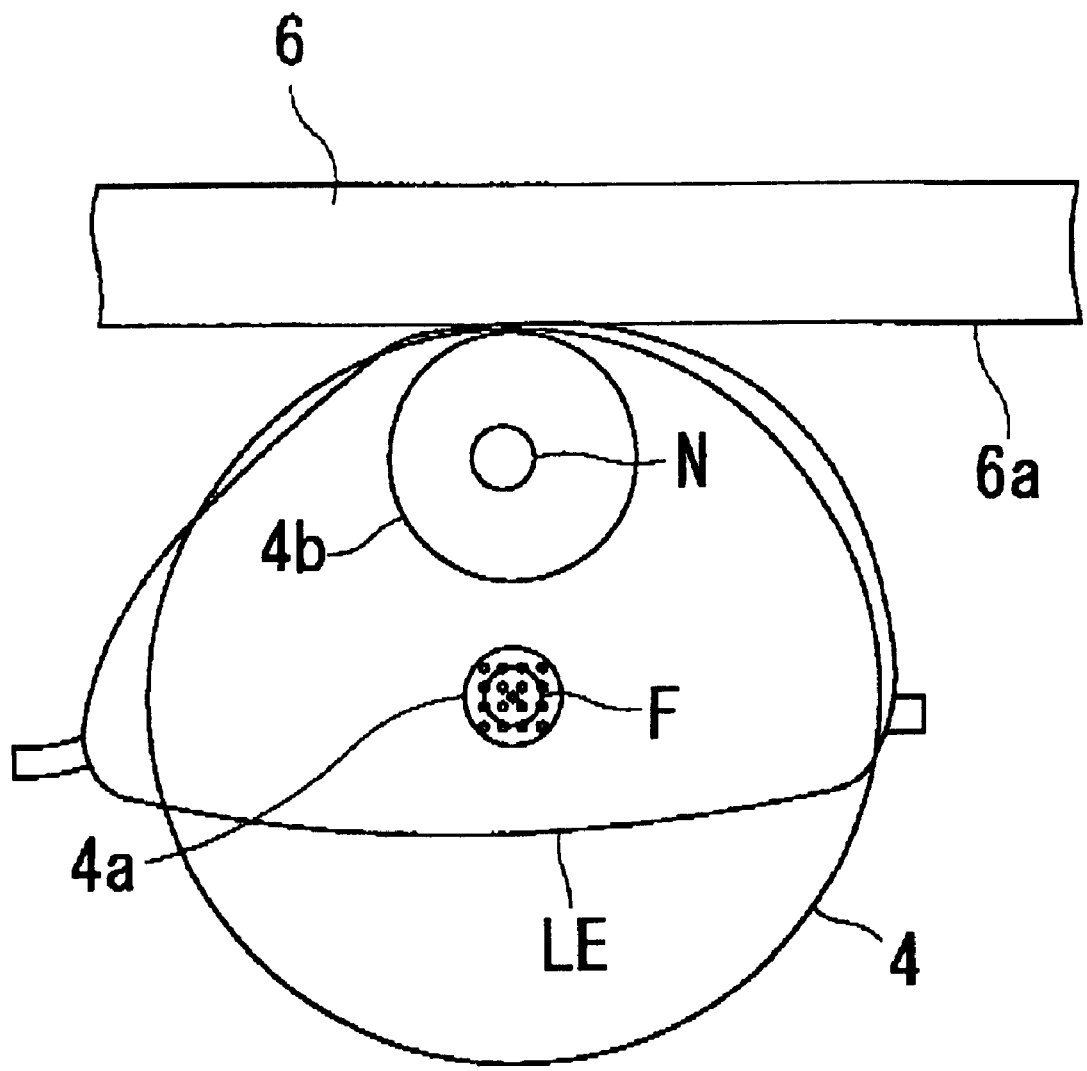
FIG. 5 is a view showing a relation between a far viewing section and a near viewing section, and a nosepiece.
Figure 6:
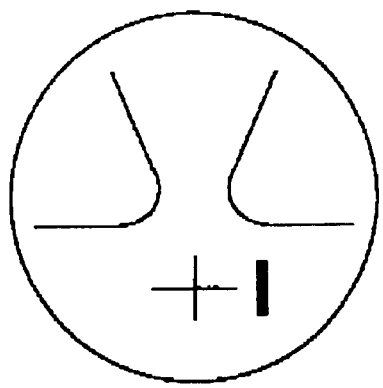
FIGS. 6A–6C are views showing a target display on a display.
Figure 6:
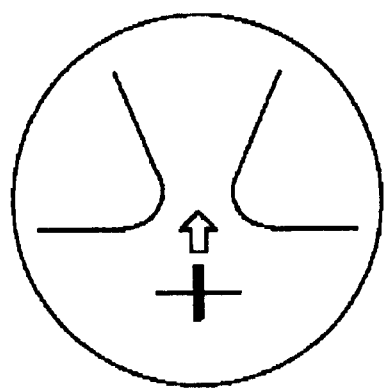
Figure 6:
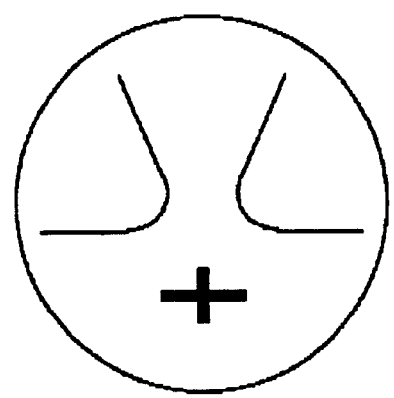

The switch 3, corresponding to the display on the display 2, is pressed to render a progressive-lens measurement mode, then the vicinity of the far viewing section of the lens LE is placed on the nosepiece 4 (the aperture 4a). As shown in FIG. 6, an alignment screen with a circle simulating the progressive lens is displayed on the display 2, and a central guide 100 and a target 101 for the alignment of the far viewing section appear therein. The alignment of the far viewing section is performed while an operator is looking at the display 2. At this time, as shown in FIG. 5, the bottom ends of the right and left lenses (or the right and left lens frames) are simultaneously brought into contact with the contact surface 6a of the lens table 6. Further, the lens holder 5 is lowered, and the back surface of the lens LE is fully in contact with the rim of the aperture 4a, then the direction of the normal to the back surface of the lens LE coincides with the optical axis L1.

FIG. 5 shows a relation of the nosepiece 4 with the far viewing section and the near viewing section of the lens LE. The light bundle, passing through the aperture 4a for measuring the far viewing section, passes through the seventeen holes of the target plate 23. The light bundle, passing through the aperture 4b for measuring the near viewing section, passes through the sixty-five holes of the target plate 33. Incidentally, for the sake of convenience in the description, the measuring point of the far viewing section (the far measuring point) of the lens LE is indicated as a region F, and the measuring point of the near viewing section (the near measuring point) as a region N. Since the near region N is designed to be decentered toward the nose side with respect to the geometric center of the lens LE, the position of the region N in a horizontal direction differs between the right and left lenses. In the case of a progressive lens, the position of the region N in the up-and-down direction varies depending on the lens. Therefore, in consideration of these circumstances, the aperture 4b is formed largely so that the measurement light bundle, which has passed through the near viewing section, may reach the target plate 33 even in the case of various lenses.

The alignment of the far viewing section will be described below. When the lens does not have an astigmatic refractive power, the far viewing section (the far measuring point) of the progressive lens is situated on a vertical axis on which the prism in the right-and-left direction of the lens is zero (an up-and-down direction under a condition of wearing spectacles is considered to be a vertical direction). The amount of prism in a horizontal direction on the vertical axis is approximately zero as stated above. Accordingly, the control unit 40 calculates the amount of prism based on the image of the hole H5 or the images of the group of the holes H1, H2, H3 and H4, and judges whether the present measuring position is near the far viewing section. If the amount of horizontal prism is still large and the far viewing section is judged not to be located within the aperture 4a, the target 101 is displayed in the right or left with respect to the central guide 100 (see FIG. 6A), so that the operator moves the lens LE toward the right or left to bring the amount of horizontal prism near to zero, then the target 101 thereby coincides with the vertical line of the central guide 100.

After the amount of horizontal prism becomes approximately zero, the control unit 40 calculates refractive powers at each measuring position based on the images of the groups of the holes H1 to H4, the holes H1, H2, H6 and H7, and the holes H3, H4, H12 and H13. In the vicinity of the far viewing section, the refractive power is approximately fixed within a range nearly as small as the diameter of the aperture 4a. Accordingly, if the refractive powers at three positions are approximately the same, the measuring positions in the vertical direction are judged to be in the far viewing section or in the range almost the same as the far viewing section. When the equivalent spherical value obtained based on the group of the holes H3, H4, H12 and H13 is more than that of the holes H1, H2, H6 and H7, the present measuring positions are judged to be in the progressive section. In this case, an arrow 102 (see FIG. 6B) is displayed as an instruction to put the lens LE toward a deep side. When the refractive powers at the three positions are judged to be approximately the same, the control unit 40 changes the display of the target 101 into a big cross 105 (see FIG. 6C) and informs of the completion of the alignment of the far viewing section. At this time, the operator pushes the switch 8 to store the measured value of the far viewing section in the memory 41. Alternatively, the control unit 40 may store the measured value into the memory 41 automatically.

When the lens LE has an astigmatic power, the amount of horizontal prism of the far viewing section does not become zero, and a correction should be made. In the case of the astigmatic power being more than the spherical power, the error of the amount of correction can be greater. On this account, the astigmatic powers obtained based on the groups of the holes H1, H2, H3 and H4, the holes H2, H4, H9 and H10, and the holes H1, H3, H15 and H16 are calculated, and the target 101 is displayed on the display 2 so that the lens LE may be moved to make the astigmatic power obtained based on the group of the holes H1, H2, H3 and H4 the smallest of those of the other groups.

If the alignment of the far viewing section is completed as described above, in other words, if the far viewing section is positioned on the aperture 4a, the near viewing section of the lens LE comes to be on the aperture 4b (comes to be within the measurement range of the second measurement optical system 30). Under this condition, the control unit 40 measures the near viewing section based on the output from the image sensor 34. Since the near viewing section is measured using the sixty-five holes of the target plate 33, optical characteristics of a large region on the periphery of the near viewing section can be measured. Firstly, optical characteristics are calculated for each group (forty-nine groups in total) of the four adjoining holes. Secondly, the control unit 40 determines one or more groups of which the astigmatic powers differ from those of the far measuring point within a predetermined permissible range (=approximately zero). Among these groups, the control unit 40 then determines the group of which the equivalent spherical value differs from that of the far measuring point more greatly than the other groups, thereby defining a measuring position corresponding to the determined group as the near measuring point. The value calculated by subtracting the equivalent spherical value of the far measuring point from that of the near measuring point is defined as an additional power and displayed on the display 2.

In the measurement of the progressive lens by the conventional lens meter, the lens LE should be moved to shift the measuring point from the far viewing section to the near viewing section through the progressive section. On the other hand, in the present lens meter, the second measurement optical system 30 for measuring the near viewing section is additionally provided, and is designed to have a large measurement region. Therefore, if the alignment of the far viewing section is completed, the near and far viewing sections can be measured simultaneously. Accordingly, it is not necessary to align the near viewing section by moving the lens LE in order to detect the near measuring point. In addition, since the near viewing section is measured from a direction in consideration of the rotation of human eyes, a power to be obtained under the actual condition of wearing spectacles may be evaluated.

The measurement of the near viewing section with the second measurement optical system 30 has been described above. The measurement mode is changed by one of the switches 3s, and in the same manner as conventional, the far viewing section and the near viewing section can be measured with the first measurement optical system 20 by moving the lens LE while the lens LE is placed on the aperture 4a.

Figure 7:
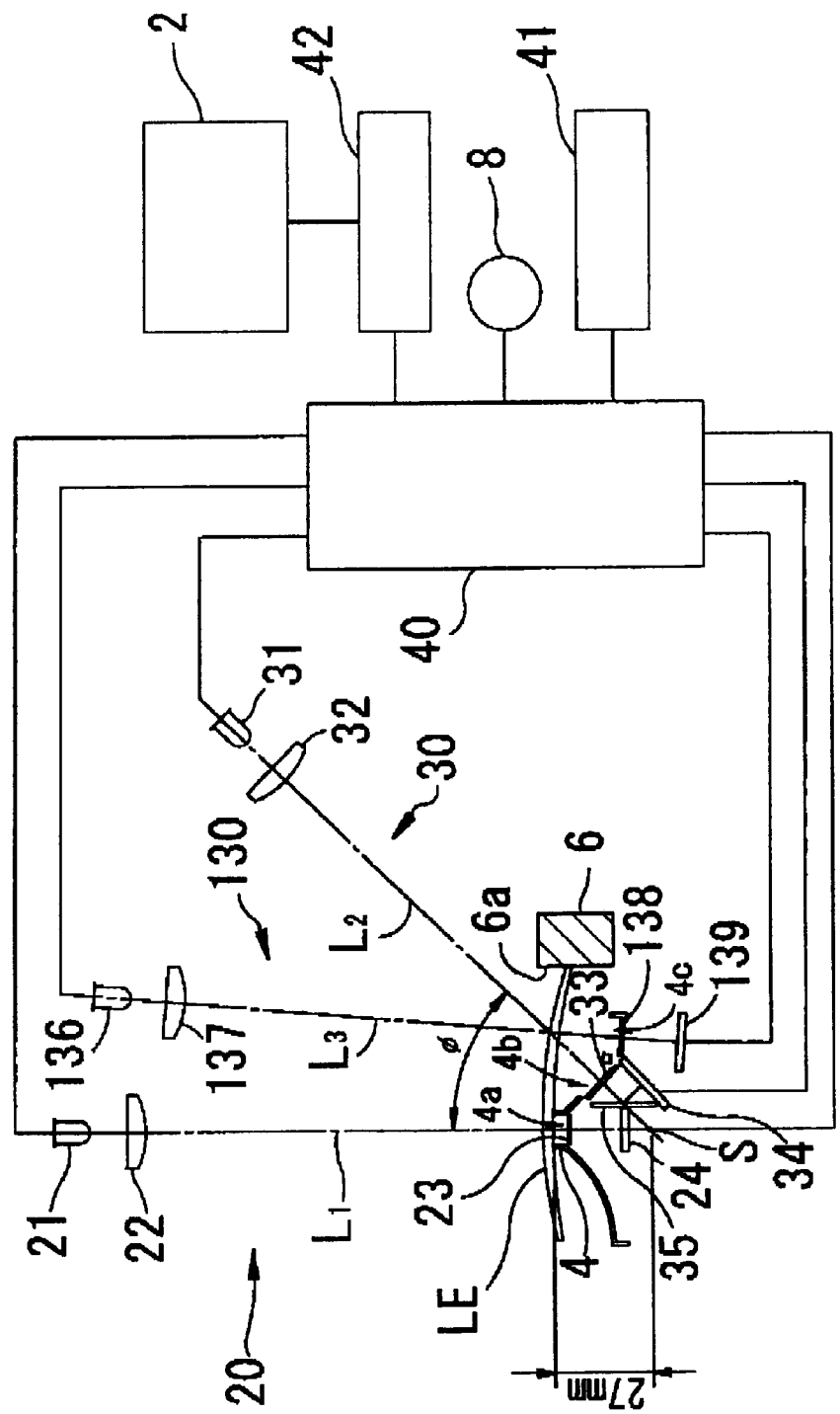
FIG. 7 is a view showing an optical system and a control system of a modified embodiment.

As a modification of the embodiment described above, a lens meter provided additionally with an optical system for measuring a near viewing section approximately vertically to the curve of the back surface of the lens LE will be described below according to FIG. 7. In this lens meter, a third measurement optical system 130 having another measurement optical axis L3 is added to the embodiment shown in FIG. 2. Similar to the first and second measurement optical systems 20 and 30, the third measurement optical system 130 is provided with a measurement light source 136 such as an LED, a collimating lens 137, a grid target plate 138 with a measurement target formed thereon, and a two-dimensional image sensor 139. The measurement target pattern of the target plate 138 is the same as that of the target plate 33. A measurement light bundle from the light source 136 is changed into a parallel light bundle by the collimating lens 137 and projected onto the periphery of the near viewing section of the lens LE. Of the light bundle transmitted through the lens LE, the light bundle having passed through an aperture 4c and each hole of the target plate 138 enters the image sensor 139. The aperture 4c is formed on the nosepiece 4, and the size of the aperture 4c is large enough to enable the light bundle transmitted through the lens LE to illuminate almost all the surface of the target plate 138.

As is the case with the optical axis L2, the optical axis L3 is disposed on the plane which is vertical to the contact surface 6a of the lens table 6 and which includes the measurement optical axis L1. Further, the optical axis L3 is set at an angle so that, when the far viewing section of the lens LE is placed on the nosepiece 4 (the aperture 4a), the periphery of the near viewing section of the lens LE is on the aperture 4c and the optical axis L3 is in the direction of the approximate normal to the back surface of the periphery of the near viewing section of the lens LE. The direction of the approximate normal in which the optical axis L3 is set is designed to be at an average angle for various progressive lenses.

With the third measurement optical system 130, the conventional condition that the near viewing section of the lens LE is measured with the lens LE appressed against the nosepiece 4 (the aperture 4a) is nearly reproduced. At the measurement of a progressive lens, the switch 3 may be used for selecting between the second measurement optical system 30 and the third measurement optical system 130. If a compliance with a value indicated on a package containing the progressive lens is intended to be known, a refractive power of the near viewing section is calculated by the third measurement optical system 130. Incidentally, the device configuration of the lens meter may be composed of only the first measurement optical system 20 and the third measurement optical system 130.

Figure 8:
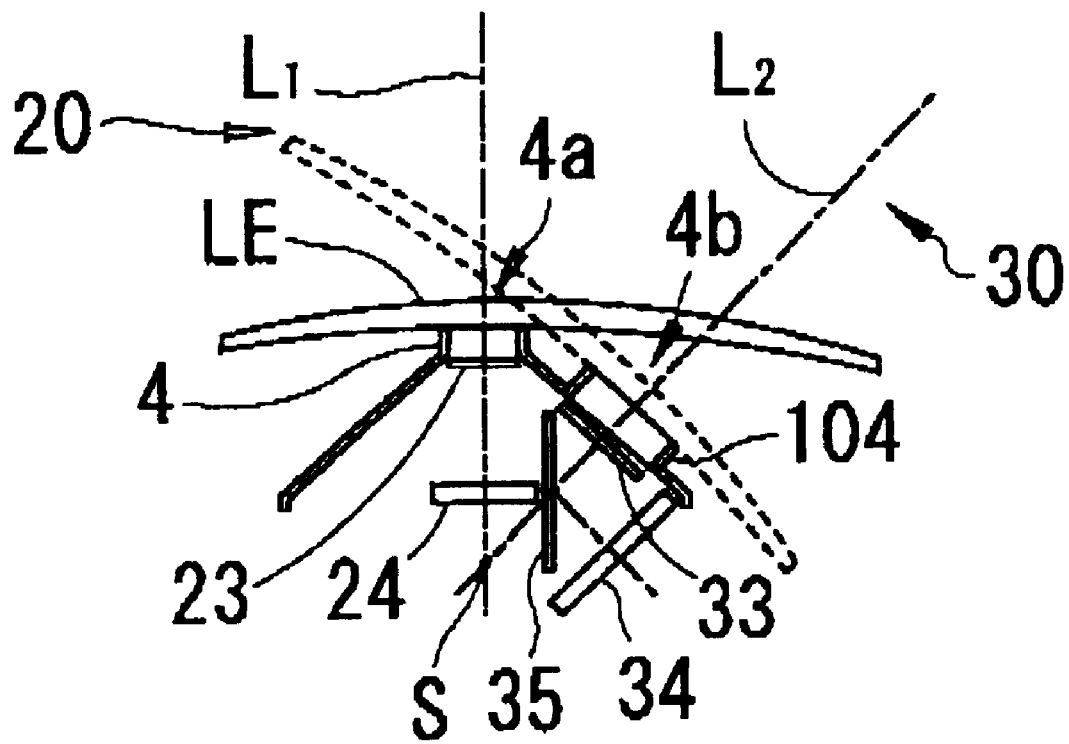
FIG. 8 is a view showing a nosepiece of a modified embodiment.

Incidentally, the target plate 138 may be disposed on the side of the light source 136 with respect to the lens LE placed on the nosepiece 4 (the aperture 4a). In addition, a plurality of the light sources 136 may be disposed two-dimensionally for obtaining a light bundle similar to the light bundle having transmitted through the target plate 138. Further, at least any one of the light sources and the photodetectors of the first, second and third measurement optical systems 20, 30 and 130 may be shared. Furthermore, as shown in FIG. 8, a lens placement section 104 to be brought into contact with the back surface of the lens LE is disposed in the aperture 4b through which the optical axis L2 passes, the near viewing section can be measured approximately vertically to the curve of the back surface of the lens LE. After aligning and measuring the far viewing section in the way described above, the lens LE is inclined while being in contact with the top end of the nosepiece 4 until the back surface of the lens LE is in contact with the placement section 104 (the lens LE in a broken line shown in FIG. 8), and the near viewing section is measured. As a result, an approximate positioning of the near viewing section may be done and the near viewing section may be measured smoothly. In addition, the placement section 104 may be designed to retract within the nosepiece 4 and the switch and the like are pushed when necessary to pop-up the placement section 104 to be placed in its position shown in FIG. 8.

As described above, according to the present invention, optical characteristics of the far and near viewing sections of a multifocal lens, particularly a progressive lens, may be measured easily.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A lens meter for measuring optical characteristics of a lens comprising:

a first measurement optical system having a first measurement optical axis, for measuring optical characteristics of a far viewing section of a multifocal lens; and a second measurement optical system having a second measurement optical axis which is different from the first measurement optical axis, for measuring optical characteristics of a near viewing section of the multifocal lens.

2. The lens meter according to claim 1, wherein the first and second measurement optical systems are disposed so that the second measurement optical axis passes through the approximate near viewing section of the lens when the first measurement optical axis passes through the far viewing section of the lens.

3. The lens meter according to claim 1, wherein the first and second measurement optical systems are disposed so that the first and second measurement optical axes intersect at a point with each other at a predetermined angle, wherein a distance between the intersecting point and a back surface of the lens disposed at a predetermined position is within a range of 25 to 30 mm.

4. The lens meter according to claim 1, wherein the first and second measurement optical systems are disposed so that the first and second measurement optical axes are positioned in a single plane.

5. The lens meter according to claim 1, further comprising a lens placement rest having:

a first aperture through which the first measurement optical axis passes; and a second aperture through which the second measurement optical axis passes.

6. The lens meter according to claim 5, wherein the second aperture has a larger opening diameter than that of the first aperture.

7. The lens meter according to claim 1, wherein the first measurement optical system comprises a first target plate disposed on the first measurement optical axis, the second measurement optical system comprises a second target plate disposed on the second measurement optical axis, and at least one of the first and second target plates includes a target plate in which a plurality of target groups each of which has at least three targets are formed at different positions.

8. The lens meter according to claim 1, further comprising a third measurement optical system having a third measurement optical axis which is different from the first and second measurement optical axes, for measuring the near viewing section of the multifocal lens.

9. The lens meter according to claim 8, wherein the first, second and third measurement optical systems are disposed so that the second and third measurement optical axes pass through the approximate near viewing section of the lens when the first measurement optical axis passes through the far viewing section of the lens.

10. The lens meter according to claim 8, wherein the first, second and third measurement optical systems are disposed so that the first, second and third measurement optical axes are positioned in a single plane.

11. The lens meter according to claim 8, further comprising a lens placement rest having:

a first aperture through which the first measurement optical axis passes;

a second aperture through which the second measurement optical axis passes; and a third aperture through which the third measurement optical axis passes.

12. The lens meter according to claim 8, wherein the first measurement optical system comprises a first target plate disposed on the first measurement optical axis, the second measurement optical system comprises a second target plate disposed on the second measurement optical axis, the third measurement optical system comprises a third target plate disposed on the third measurement optical axis, and at least one of the first, second and third target plates includes a target plate in which a plurality of target groups each of which has at least three targets are formed at different positions.

13. The lens meter according to claim 1, wherein the multifocal lens includes a progressive focal lens.

* * * * *